US011548671B2

(12) United States Patent
Gorbatenko et al.

(10) Patent No.: US 11,548,671 B2
(45) Date of Patent: Jan. 10, 2023

(54) APPARATUS AND SYSTEM TO FILL SINGLE-SERVE BIODEGRADABLE COFFEE PODS

(71) Applicant: Gorby LLC, St. Paul, MN (US)

(72) Inventors: George Gorbatenko, St. Paul, MN (US); Charles Roth, Hudson, WI (US); Chris Zwettler, Stillwater, MN (US)

(73) Assignee: GORBY LLC, Saint Paul, MN (US)

( * ) Notice: Subject to any disclaimer, the term of this patent is extended or adjusted under 35 U.S.C. 154(b) by 0 days.

(21) Appl. No.: 17/336,651

(22) Filed: Jun. 2, 2021

(65) Prior Publication Data

US 2021/0292022 A1    Sep. 23, 2021

Related U.S. Application Data

(63) Continuation of application No. 15/428,788, filed on Feb. 9, 2017, now Pat. No. 11,084,615.

(60) Provisional application No. 62/315,888, filed on Mar. 31, 2016.

(51) Int. Cl.
| | | |
|---|---|---|
| B65D 85/00 | (2006.01) | |
| B65B 51/10 | (2006.01) | |
| B65D 65/46 | (2006.01) | |
| B65B 7/28 | (2006.01) | |
| B65B 43/50 | (2006.01) | |
| B65D 85/804 | (2006.01) | |
| B65B 29/02 | (2006.01) | |

(52) U.S. Cl.
CPC ............ B65B 51/10 (2013.01); B65B 7/2878 (2013.01); B65B 29/025 (2017.08); B65B 43/50 (2013.01); B65D 65/466 (2013.01); B65D 85/8043 (2013.01); Y02W 90/10 (2015.05)

(58) Field of Classification Search
CPC .............. B65D 77/003; B65D 85/8046; B65D 85/8043; B65D 85/8061; B65B 7/164; B65B 29/02; B65B 29/022
USPC .......................................................... 418/8
See application file for complete search history.

(56) References Cited

U.S. PATENT DOCUMENTS

| | | |
|---|---|---|
| 214,230 A | 4/1879 | Babcock |
| 1,011,630 A | 12/1911 | Lassen |
| 1,521,328 A | 12/1924 | Schrader |
| 2,265,277 A | 12/1941 | Gerke, Jr. |
| 3,195,284 A | 7/1965 | Crane, Jr. |
| 3,946,537 A | 3/1976 | Hair et al. |
| 4,024,694 A | 5/1977 | Cooper et al. |
| 5,301,488 A | 4/1994 | Ruhl et al. |
| 5,325,765 A | 7/1994 | Sylvan et al. |
| 5,450,710 A | 9/1995 | Jensen et al. |
| 5,765,342 A | 6/1998 | Jensen et al. |
| 5,840,189 A | 11/1998 | Sylvan et al. |

(Continued)

FOREIGN PATENT DOCUMENTS

FR            3040979 B1    10/2017

*Primary Examiner* — Eyamindae C Jallow
(74) *Attorney, Agent, or Firm* — Kagan Binder, PLLC

(57) ABSTRACT

An apparatus is disclosed for filling single-serve biodegradable coffee pods. In one embodiment, a single-serve pod will include an outer shell defining an interior of the pod, a filter containing a product to be brewed, and a film lid at a top of the pod; and a filter support that supports an upper filter support portion counter the force of a filter that expands and thereby applies a downward pressure on the upper filter support portion during a brewing process.

20 Claims, 8 Drawing Sheets

(56) References Cited

U.S. PATENT DOCUMENTS

| | | | |
|---|---|---|---|
| 8,443,717 B2* | 5/2013 | Venturi | B65D 85/8049 |
| | | | 426/77 |
| 8,720,320 B1* | 5/2014 | Rivera | A47J 31/0678 |
| | | | 99/295 |
| 8,875,477 B2 | 11/2014 | Rivera | |
| 9,271,602 B2* | 3/2016 | Beaulieu | A47J 31/446 |
| 9,468,230 B2* | 10/2016 | Roberts | A23L 2/385 |
| 9,963,256 B2 | 5/2018 | Hansen et al. | |
| 2005/0183581 A1* | 8/2005 | Kirschner | A47J 31/3633 |
| | | | 99/295 |
| 2006/0196364 A1* | 9/2006 | Kirschner | A47J 31/3623 |
| | | | 99/295 |
| 2006/0236871 A1* | 10/2006 | Ternite | B65D 85/8061 |
| | | | 99/295 |
| 2007/0261370 A1 | 11/2007 | Marshall et al. | |
| 2008/0299262 A1 | 12/2008 | Reati | |
| 2010/0047419 A1 | 2/2010 | Boul | |
| 2011/0274802 A1* | 11/2011 | Rivera | B65D 85/8061 |
| | | | 426/431 |
| 2011/0303095 A1 | 12/2011 | Fu et al. | |
| 2012/0207895 A1* | 8/2012 | Rivera | A47J 31/0689 |
| | | | 426/433 |
| 2012/0279178 A1 | 11/2012 | Griscik et al. | |
| 2015/0158609 A1 | 6/2015 | Villain et al. | |
| 2015/0239652 A1* | 8/2015 | Trombetta | A23F 5/243 |
| | | | 426/594 |
| 2015/0307267 A1 | 10/2015 | Jackson | |
| 2016/0009429 A1 | 1/2016 | Mahoney et al. | |

* cited by examiner

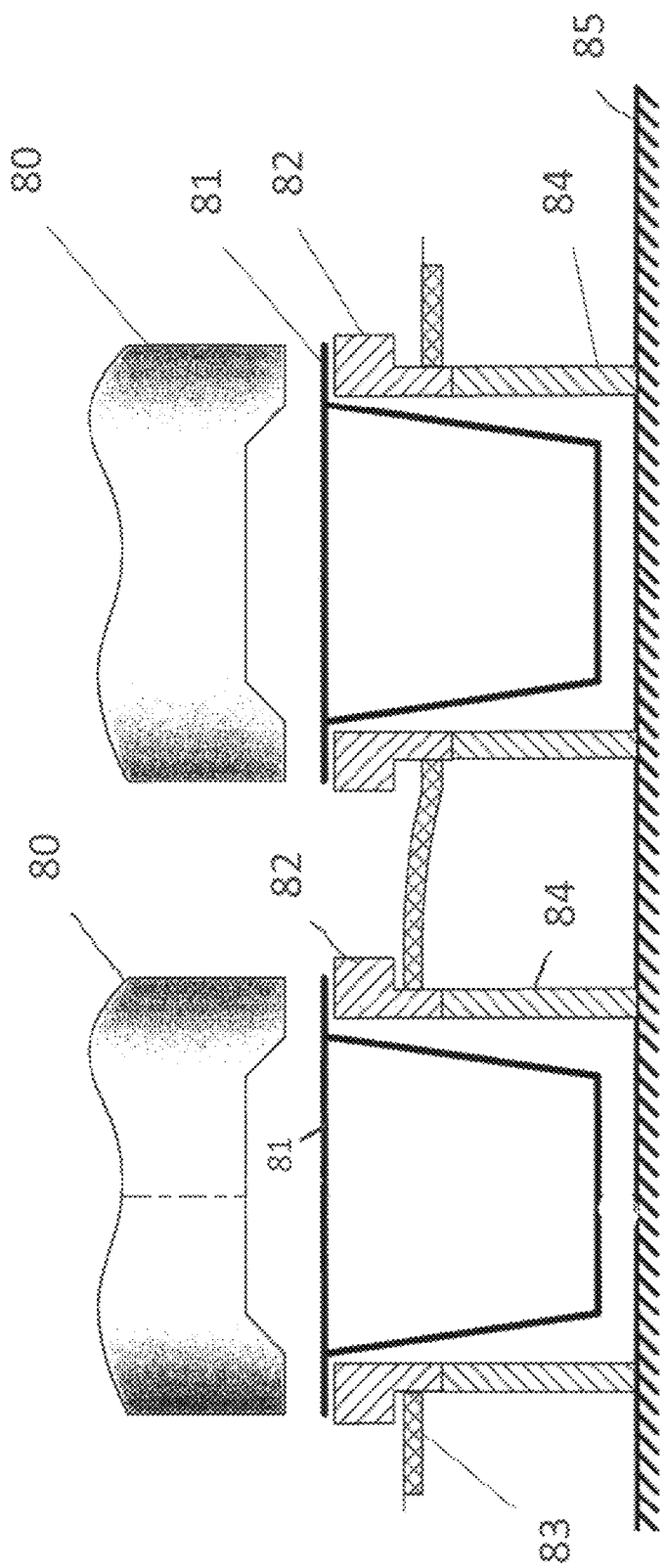

APPARATUS AND SYSTEM TO FILL SINGLE-SERVE BIODEGRADABLE COFFEE PODS

PRIORITY CLAIM

This application is a continuation application of U.S. application Ser. No. 15/428,788, filed Feb. 9, 2017, entitled "APPARATUS AND SYSTEM TO FILL SINGLE-SERVE BIODEGRADABLE COFFEE PODS," now allowed, which claims the benefit of U.S. Provisional Application Ser. No. 62/315,888, filed Mar. 31, 2016, entitled "APPARATUS AND SYSTEM TO FILL SINGLE-SERVE BIODEGRADABLE COFFEE PODS," the entire contents of which are herein incorporated by reference in their entireties.

FIELD OF THE INVENTION

This invention relates to a device and method for filing single serve hot beverage containers.

BACKGROUND OF THE INVENTION

Single serve brewing devices and methods have become popular recently, as consumer desire a hot beverage on demand without any effort.

Many factors contribute to an optimum quality of a hot beverage, for example a brewed beverage. For example, brewed coffee may be influenced by the bean, roast, water, grind, ratio of coffee to water, brew time, and temperature of the water. The relationship between grind and the amount of coffee is important. A finer grind extracts more flavors from the coffee, but can easily become bitter. In contrast, a coarser grind produces a smoother flavor, but requires more coffee to achieve the same flavor. Unfortunately, single serve coffee pods do not allow the user to increase the amount of coffee contained in the pods.

SUMMARY OF THE INVENTION

The disclosed apparatus and packaging system provides packaged ground coffee in small pods made from materials that are certified 100% bio-compostable. Geared to the smaller specialty coffee roaster, it is affordable, compact, reliable and able to function in a wide range of settings.

The disclosed apparatus and system are designed to allow the smaller specialty coffee roasters to participate in the fast growing single-serve market while being good stewards of the environment.

There is ample evidence among specialty coffee roasters that the subtle flavors associated with quality coffee rapidly degrade with time, perhaps hours after roasting. To capture those flavors requires on-site packaging.

To be viable for the smaller roasters, however, a suitable system must be compact, restricted to the use of readily available power (110/220 VAC), affordable and must be capable of delivering professional results in both quality and quantity.

While convenient, the growing single-serve market is producing pods that fill current landfills. In contrast, the disclosed coffee pods are comprised of 100% compostable materials, typically polylactic acid (PLA) made from lactic acid obtained from cornstarch.

In one embodiment of the present disclosure is an apparatus for filling single-serve biodegradable pods, comprising a base supporting a rotatable platform comprising multiple pod holders located at three stations displaced equidistant in 120° sectors around the rotatable top;

a filler mounted on the base and adjacent to the rotatable platform comprising a container filled with a food product and multiple augers capable of filling the pods with ground food product, wherein the multiple augers having multiple spouts to deliver the ground food product to multiple pods;

a sealer mounted on the base and adjacent to the rotatable platform comprising a heat sealable film winder, a movable heater block assembly fitted with an accurate linear actuator and a heat sealable film trimmer, wherein the heater block assembly is aligned with tops of the pods to apply and seal the heat sealable film to the tops of the pods, and wherein the trimmer cuts the heat sealable film sealed to the pods, and a controller directing rotation of the rotatable platform, filling of the ground food product from the filler, and sealing and trimming of the sealed film tops of the single-serve, biodegradable pods.

In an embodiment, the pod holders are capable of holding four pods at a single time. The pods may comprise a filter located at a bottom of the pods. The pods may be capable of withstanding temperature up to 325° F. The pods may be biodegradable, for example, made from polylactic acid. In an embodiment, the pods may further comprise 2% $TiO_2$, 1% IM, (Biomax Strong 129), and 2% Nucleant (CN-L03 (EBS)).

The apparatus is capable of filling pods with a food product, the food product may be coffee, tea, hot chocolate, and powdered milk, or other similar food product.

In another embodiment, the apparatus may further comprise an actuator to remove the pods after being filled with the food product.

Another embodiment of the present disclosure is a system for filling single-use, biodegradable pods, the system comprising a controllable, rotatable platform comprising multiple pod holders located at three stations displaced equidistant in 120° sectors around the rotatable top adapted to move empty pods from a load station on the platform, to a filling station, and then to a sealing and trimming station;

a controllable filler comprising a container filled with ground food product and multiple augers and multiple spouts that are adapted to deliver filling ground food product into the pods, wherein the multiple augers and multiple spouts deliver ground food product to the empty pods;

a controllable sealer and trimmer comprising a heat sealable film winder, a movable heater block assembly fitted with an accurate linear actuator, and a heat sealable film trimmer, wherein the heater block assembly is aligned with a top of the pods to apply and seal the heat sealable film to a top of the pods, and wherein the trimmer cuts the heat sealable film sealed to the pods; and a controller comprising software controlling and directing movement and operations of the rotatable platform, the filler and the sealer trimmer to fill single serve, biodegradable coffee pods with ground food product, and heat seal a film top to the filled pods.

In an embodiment, the pod holders are capable of holding four pods at a single time. The pods may comprise a filter located at a bottom of the pods. The pods may be capable of withstanding temperature up to 325° F. The pods may be biodegradable, for example, made from polylactic acid. In an embodiment, the pods may further comprise 2% $TiO_2$, 1% IM, (Biomax Strong 129), and 2% Nucleant (CN-L03 (EBS)).

The apparatus is capable of filling pods with a food product that is a food-based product transported by, or that that can be deliver to a pod, using an auger. In some embodiments, the food product may be coffee, tea, hot chocolate, and powdered milk, or other similar food product.

In another embodiment, the apparatus may further comprise an actuator to remove the pods after being filled with the food product.

BRIEF DESCRIPTION OF THE DRAWINGS

FIG. 7 illustrates an embodiment of a pod holder

DETAILED DESCRIPTION

Figure 1:
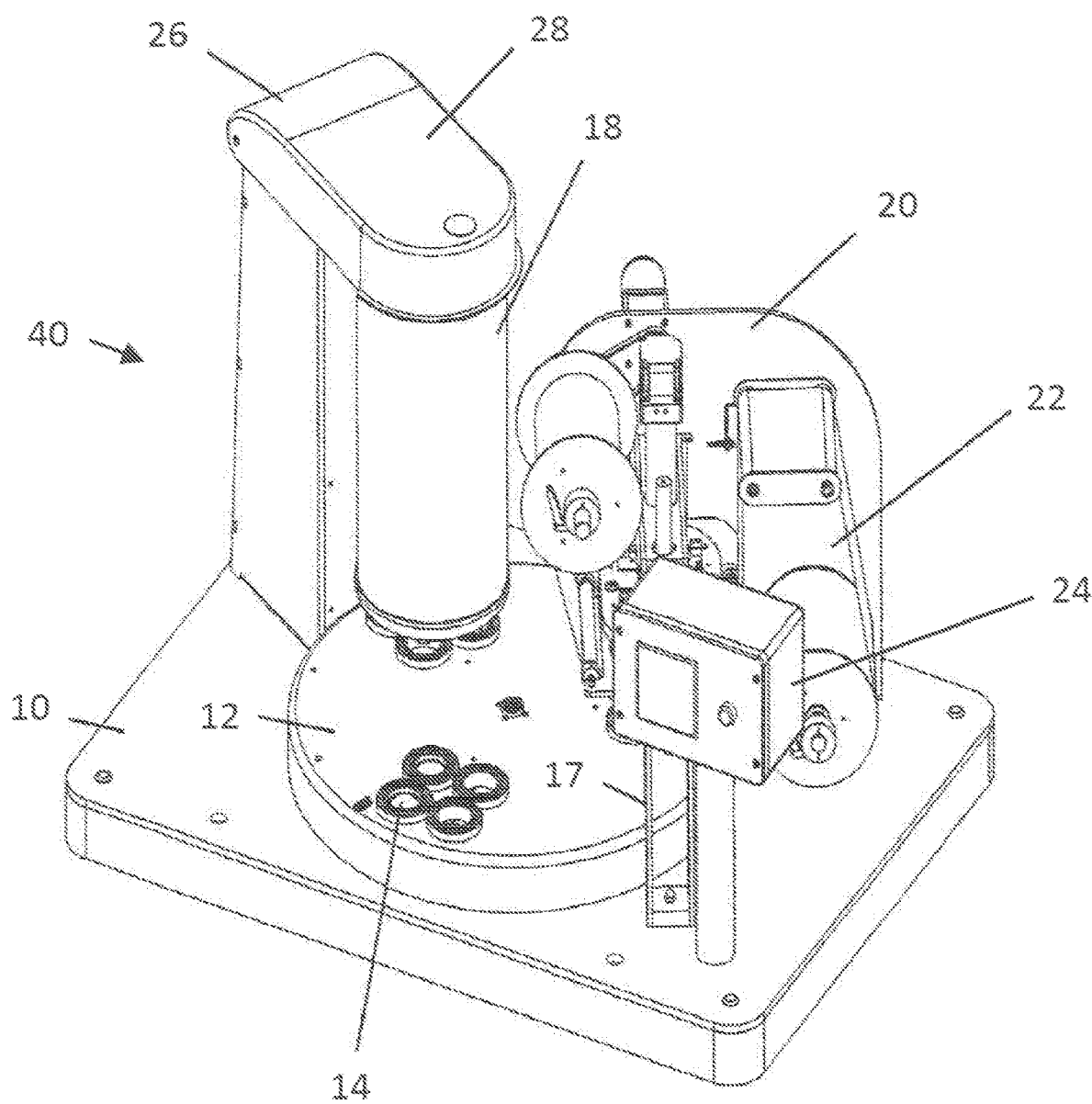
FIGS. 1-3 illustrate an example embodiment of an apparatus for filling single-serve biodegradable coffee pods.

While the disclosed subject matter is amenable to various modifications and alternative forms, specific embodiments have been shown by way of example in the drawings and are described in details below. The intention; however, is not to limit the disclosure to the particular embodiments described. On the contrary, the disclosure is intended to cover all modifications, equivalents, and alternatives falling within the scope of the disclosure as defined by the appended claims.

The disclosed apparatus and packaging system provides packaged ground coffee in small pods made from materials that are 100% bio-compostable. Geared to the smaller specialty coffee roaster, the apparatus is affordable, compact, reliable and able to function in a wide range of settings.

The major components of the disclosed apparatus and system are the biodegradable pods, the filler, seal and trimmer, lid film transport, turntable, and computer control.

Figure 2:
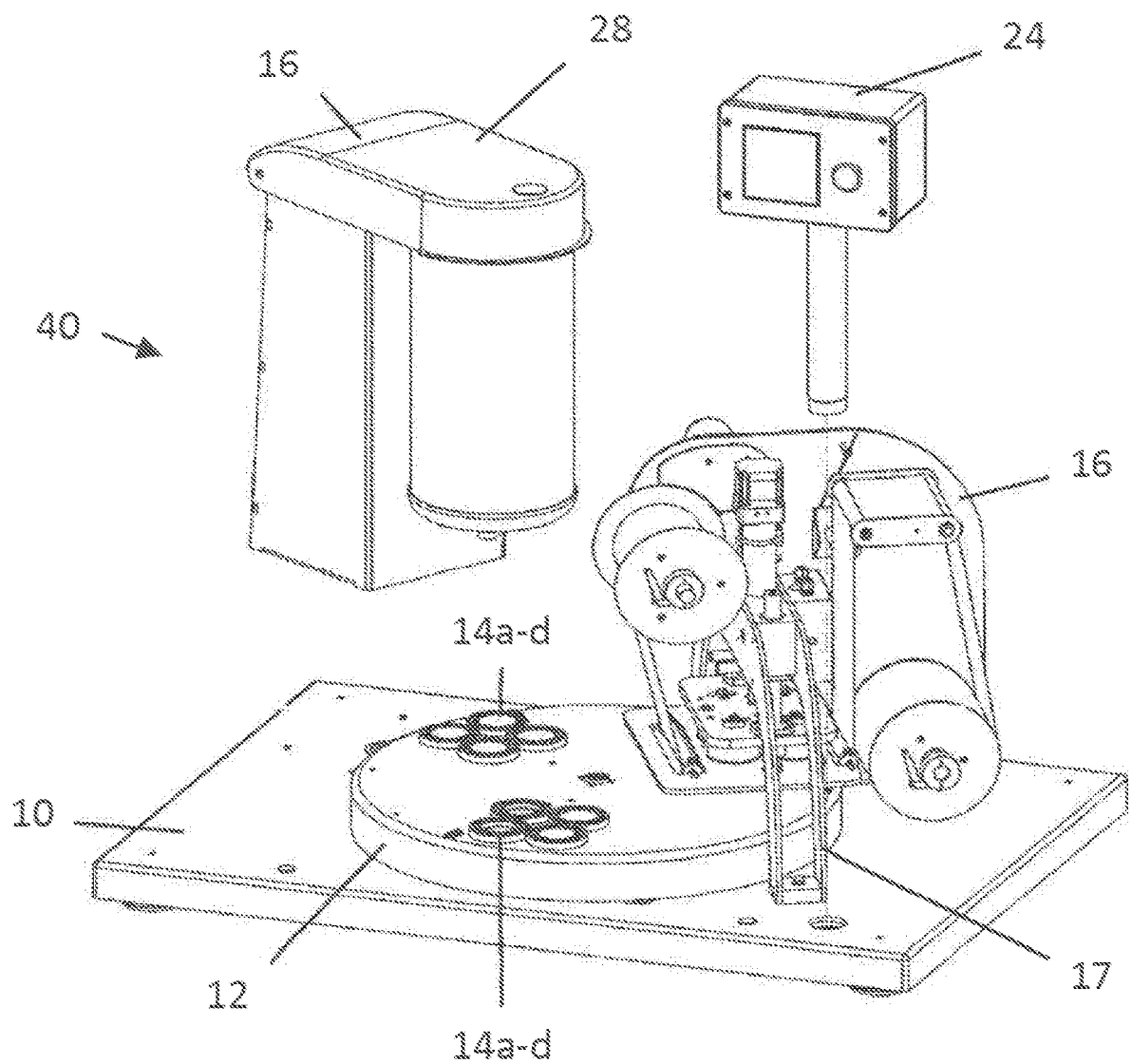
Figure 3:
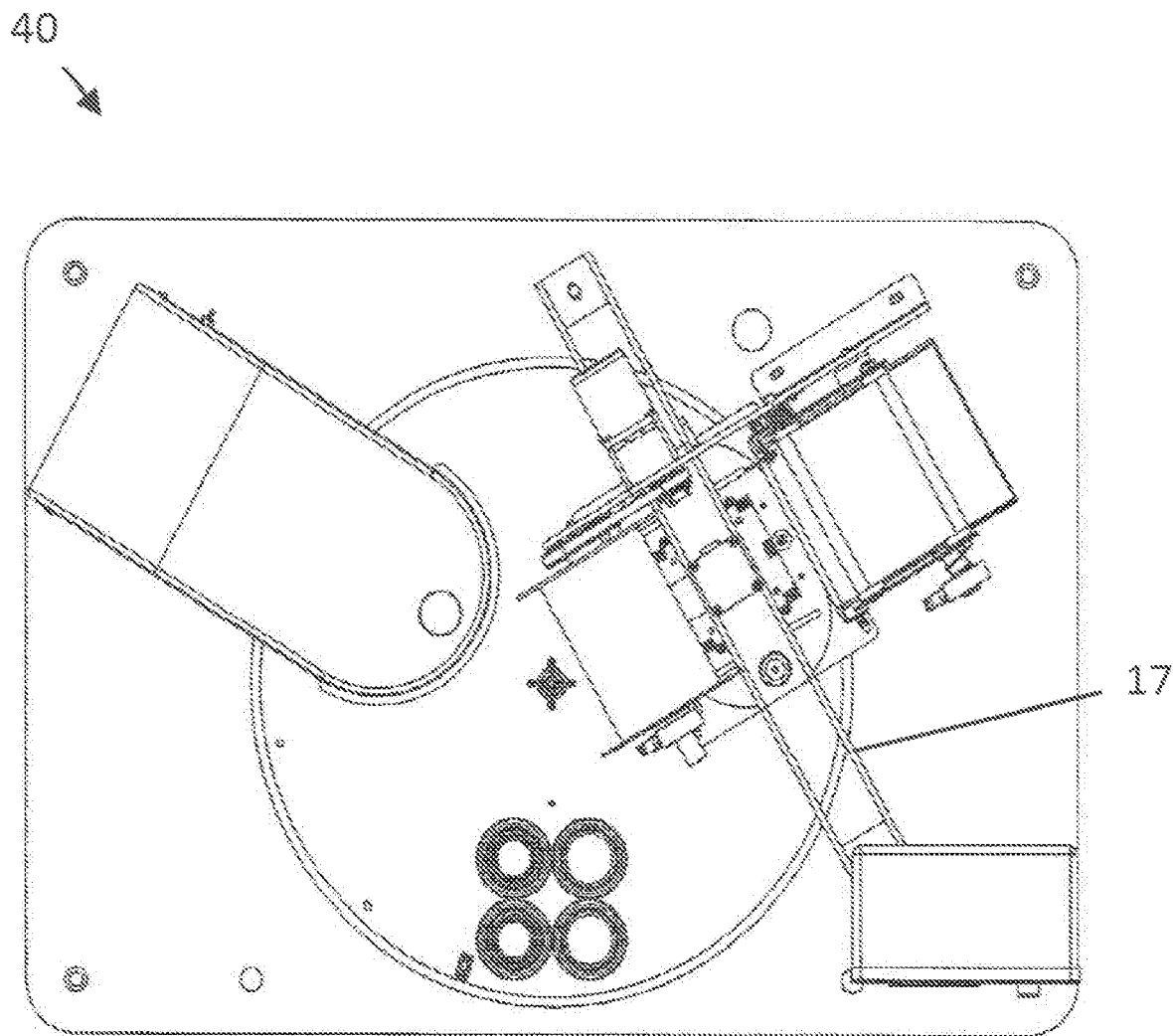

FIGS. 1-3 illustrate a filling apparatus 40 for filling single-serve pods 30. The filling apparatus 40 includes base 10 for supporting rotatable platform 12 having multiple pod holders 14, auger assembly 26 having container 18 filled with a food product and multiple augers (not shown) capable of filling the pods 30 with the food product, seal and trim station 20 mounted on the base 10 comprising a heat sealable film winder 22, and a controller 24 directing rotation of the rotatable platform 12, filling of the food product from the auger assembly 26, and sealing and trimming of the sealed film tops of the single-serve pods 30.

In one embodiment, a filling cylinder 18 is attached to a tall mounting tower 42 on the base 10. Four gear driven augers (not shown) are positioned above the multiple pod holders 14 to feed the food product into the pods 30. The capacity of the enclosed cylinder 18 is about 5-7 pounds of food product. Agitators (not shown) are mounted on the auger shaft to insure even distribution of food product in each of the pods 30.

The amount of food product filled is based on time. By varying the time that the augers rotate, more or less food product can be delivered into the pods 30. The filling cylinder 18 is easily removed from its stand and replaced by a second filling cylinder, thereby accommodating different food product. Once removed, a single screw allows for easy disassembly for washing or sanitizing. Once the pods 30 are filled, they proceed to seal and trim station 20.

In an alternate embodiment, a food product may be distributed and delivered to the unfilled pods using controllable valves instead rotatable augers. The controllable values would be moved to an open position to allow the food product to be delivered to the pods via gravity flow and then moved to a closed position when the pods are filled and moved to the next station, the sealing station, of the disclosed system. One skilled in the art would readily understand different types of suitable valves that may be used in this embodiment. A pinch-type valve, for example, that clamps or pinches a flexible valve stem and operated by a solenoid could be used in this particular embodiment.

A food product may be selected from, for example, coffee, hot chocolate, tea, powdered milk, formula, or other similar food product.

Alignment between the heater block 60 (and all its components) and the pod holders 14 correspond to bushing in the rotatable platform 12. After each operation, the position of the rotatable platform 12 is re-calibrated as is the home position of the sealer, thereby eliminating accumulated errors.

The rotatable platform 12 is the means by which pods 30 are transported from load/unload, to fill, to seal and trimmer, and back to load/unload. The 2×2 pod matrix is accurately defined by the precision placement of pod holders 14. Bushings to accept the aforementioned tapered pins are accurately positioned on 120° sector boundaries in alignment with the three stations of the filling apparatus 40.

In one embodiment, the empty pods are placed by hand into the pod holders by an operator. In another embodiment, the empty pods are placed into the pod holders using an automated or semi-automated feeder. A stack of empty pods, for example could be arranged above the pod holders and then dropped into place using a controllable feeding system.

Inherent in the manufacture of the rotatable platform 12 (spun from aluminum disks) is the introduction of a slight concave or convex surface. Under normal circumstances, this would introduce a variable and likely a press error. To minimize that likelihood, a support block (not shown) is installed beneath the turntable in the press location but slightly higher so the pod holders 14 rise onto the support block. When the press occurs, all three elements (pod holders 14, rotatable platform 12, and support block) are pressed together.

Beneath the rotatable platform 12 are three pins that are mounted to correspond to the 120° sectors. Those pins interrupt a light beam which provides an independent reference for the turntable's stepper motor.

There are also two holes in the rotatable platform 12 that allow an in-field calibration means of positioning the supporting arch so that it is properly aligned to the pod holders 14. Existing tapered pins in the stripper plate are used for that purpose.

To remove the rotatable platform 12, the container 18 must be removed first. The sealing and trim station 20 must be raised above the rotatable platform 12. By unscrewing a hub screw, the rotatable platform 12 is free to be removed from the base 10 by lifting up and then carefully pulling out. When reinstalling the rotatable platform 12, the rotatable platform 12 should be rotated so that the pod holders 14 are not in line with the sealing axis. Failure to do this will likely damage the 120° defining sector pins.

The rotatable platform 12 is spun from aluminum to produce a sturdy three-dimensional structure. The turn-down lip provides the strength while hiding operations beneath the rotatable platform 12. Operations include a geared motor (drives rotatable platform 12), a sector sensor (defines the sectors), and pod sensor (senses empty or misaligned pods 30).

All key features are based off the rotatable platform 12 center, a reference that is used to fabricate the rotatable platform 12 and thus inherently accurate. Precision bushings are installed at sector intervals to ensure perfect rotational alignment.

Once the pods 30 are sealed, they are rotated to the final station where they are pushed up from underneath by a ramp for easy withdrawal from the pod holders by an operator. Alternatively, the filled, sealed pods could be projected upward and out of the holder using a controlled push pin or push bar and the ejected pods could then be swept from the pod holders using a controlled arm or bar the removes the filled sealed pods from the pod holders and rotatable platform in order for the system to begin another filling cycle.

The filler apparatus 40 has a controller 24. A programmable logic controller (PLC) accepts inputs from the various sensors, processes them, and then sends signals to the various motion control systems. A touch screen accepts operator input and allows all the input parameters to be set. In addition, the system allows subsystems to be exercised and validate IO signals.

There are two modes of operation: an auto mode for normal operation where much if not all the thinking is performed for the operator by the controller software and hardware, and a manual mode that is geared to be used by a trained technician.

The various functions and operating screens of the computer controller allow a user to monitor the process. In both modes, the controller 24 is used to monitor system operation to insure conditions are safe, particularly in connection with the heater.

A manual mode allows the user to change certain operating. The operating screen may comprise multiple different screens, each dedicated to a particular function, e.g. turntable, top film, press, etc. It is intended for diagnostic use by trained technicians.

The operating screen comprises a main screen that contains all the key information for production running. A password may be required to access any of the manual screens. In the manual screen, for example, a heater shut down is an option, or jogging the actuator and setting dwell time.

In an automatic mode the operator uses one screen. Pod counts can be set, monitored, and reset. Warnings can also be displayed. Heater temperature and dwell time are displayed but not acted on or are capable of being changed. An array of green lights signals to the operator that the machine is ready for processing the next four pods. In addition, distinctive audio tones can be generated that are associated with this array.

The operator extracts the filled pods 30, and replaces with four empty pods 30. Once in place, the operator signals completion by pressing simultaneously two buttons on either side of the base 10.

An advantage to a controller 24 is that it can be programmed to detect normal or abnormal conditions. An undetected thermal runaway system poses a serious fire threat. A simple kink in a thermocouple (TC) wire or a broken lead could well cause such a case. The following checks are made in connection with the heater: a) indicated temperature is slow to increase, b) temperature is rising faster (slower) than prescribed, and c) temperature far exceeds set point (beyond what expected with thermal overshoot). In these cases, the power to the heater is turned off. Heater power will also turn off when unattended operation exceeds a prescribed limit Since these failures are found by a controller 24, if there is an errant computer that is unable to detect errors a thermal limit switch will open and act as if the emergency-power-off switch (EPO) has been pressed. In any powered system involving motors, gears, the opportunity of crushing fingers or breaking bones is present despite the presence of warning labels and guards. In case of emergencies, hitting the EPO switch on the control panel will disable all control panels to the motors. A controller 24 controls all aspects of the system. In addition to the normal functions, the controller 24 guards against operator errors that, if left unattended, could damage the system.

Particularly noteworthy is establishing a plan for moving temperature from one point to another so as to minimize thermal overshoot. If the system doesn't follow the plan within prescribed limits, a potential error condition is assumed and the heater is turned off. Another feature is the aids to diagnosing problems like exercising the I/O.

Figure 4A:
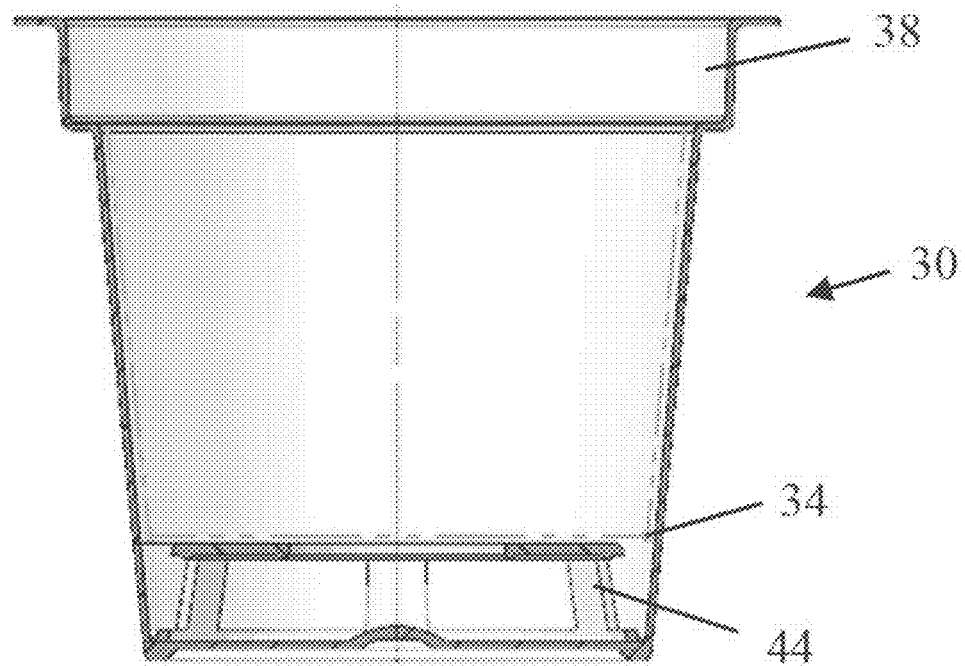
FIG. 4*a* illustrates an example embodiment of a pod.

Pods 30 are shown in FIG. 4a and may be formed from polylactic acid (PLA); a material that can be made from corn starch. The pods 30 can be vacuum-formed from sheets or injection molded. The pods 30 may have a built in filter support 32 or a separate component or piece that is inserted and serves the same function. The pods 30 are sealed with a top film 16 that may contain a graphic image that bears the roaster's logo and/or identifies the contents.

Pods 30 may be filled with food product such as, but not limited to, coffee, hot chocolate, tea, powdered milk, formula, or other similar food product.

To withstand temperatures normally associated with brewing coffee, the pods 30 are made in crystalline form. While being formed, the pods 30 are typically in an amorphous form and at the end of the process the material is transformed to the crystalline state. The pods 30 have a crystalline structure sufficient to withstand temperatures up to 212° F. The pods 30 have a proper balance of heating properties, resin mixture, nucleant, impact modifier (IM), and colorant.

The size of the pods 30 is generally the size of the de facto standard defined by Keurig® Green Mountain, Inc. Alternatively, the pods 30 may be the size of the standard pod used by a Nespresso® machine. The pods 30 has a ledge 34 which is capable of supporting a filter (not shown) and also includes a bottom 36 that is able to be pierced.

In addition to the PLA resin the following components may be added to the pods 30: 2% $TiO_2$, 1% IM, (Biomax Strong 129), and 2% Nucleant (CN-L03 (EBS)).

Because of the importance of tight physical tolerances for the pods 30, injection molding is utilized. Too much heat will cause premature crystallization and restrict mold flow. As a result, only a certain percentage of the material in each of the pods 30 is crystallized to aid in the molding process. By sealing the formed pods 30 at elevated temperatures (greater than 250° F.) a "crystalline boost" is achieved in the area near the lip. This increases the percentage of crystallization near the rim and thereby makes the pods 30 more heat tolerant when used in a suitable coffee brewing machine.

Figure 4B:
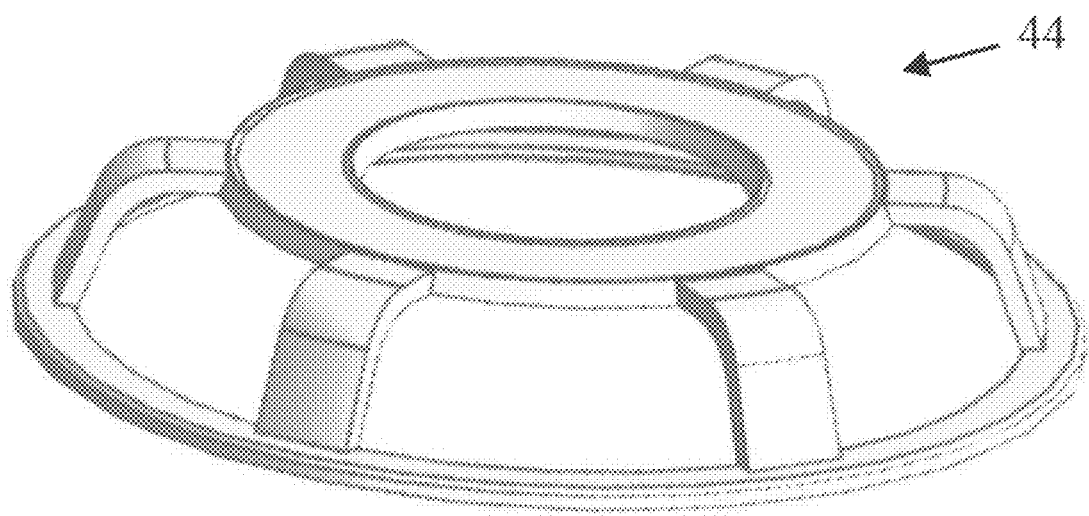
FIG. 4*b* illustrates an example embodiment of a filter support.

Filter support 32 is shown in FIG. 4b. The filter support prevents the exit needle of the coffee brewing machine from puncturing the filter when the pod is used to brew a cup of coffee. The filters may be made from paper or other material capable of filtering the food product from the water. The filter can sit on a ledge 34 of the pods 30 or fastened to a wall of the pods 30 as an integral unit. The bottom of filter is deep enough to hold sufficient amount of food product, such as coffee, yet high enough to avoid being inadvertently pierced during use. It is important that the filter is below the plane of the lip 38 of the pods 30 so as to not introduce a third material in the seal process.

There are many factors that contribute to an optimum quality of brewed coffee. Factors include, for example, bean quality, roast, water, grind, ratio of coffee to water, brew time, or temperature. Many of these factors are addressed by the coffee brewing machine, but some of these factors may be addressed and optimized by the coffee pod configuration and structure. One factor is the relationship between grind and the amount of coffee in the pod. A finer grind will extract more flavors for a given amount of coffee, at the expense of becoming bitter. In contrast, a coarser grind is smoother and less bitter but requires a greater amount of coffee to achieve the same flavor. Being able to increase the amount of coffee in a pod is desirable for smoother coffee with more flavor.

Figure 5A:
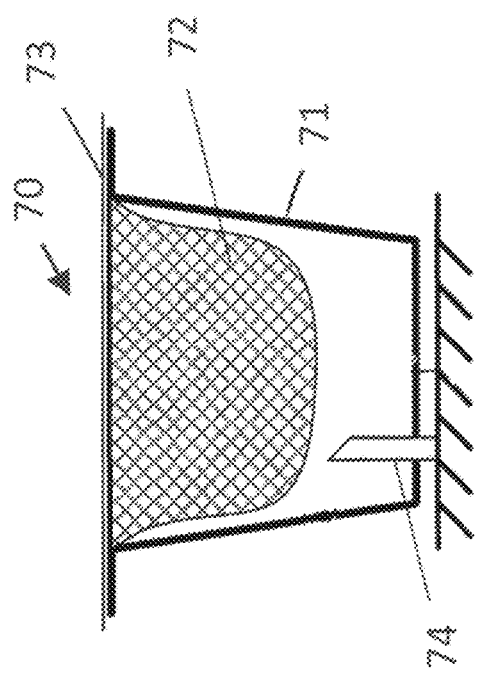
FIGS. 5*a*, 5*b* and 5*c* illustrate the use of a pod with and without a filter support.

FIG. 5a illustrates a generic pod 70 having of an outer shell 71, a filter containing the coffee 72, and a film lid 73. In the figure the bottom of the pod is pierced by an exit needle 74 allowing the brewed coffee to flow out pod.

While it is desirable to increase the amount of coffee in the filter, the amount of coffee in the filter is constrained by the exit needle on the bottom of the pod and by the lid on top of the pod.

During the brew process, coffee grounds o will naturally expand in the interior of the pod. An increased capacity filter, desirable in one sense, is prone to puncture when the pod is pierced by the exit needle. If the filter is pierced it will create an undesirable flow, grounds in brewed coffee, and likely a clogged exit needle. In addition, due to restricted exit flow, pressure may build within the pod forcing a blowout between the lid and the rim of the pod.

Figure 5C:
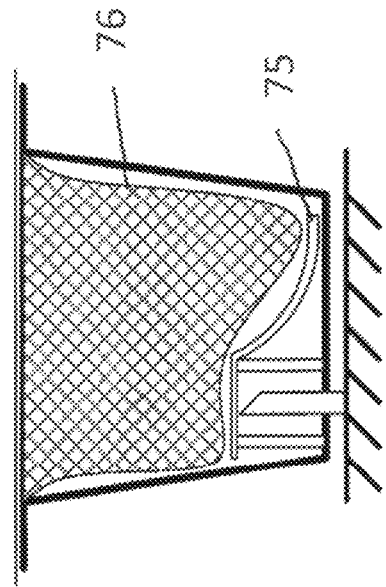
Figure 5B:
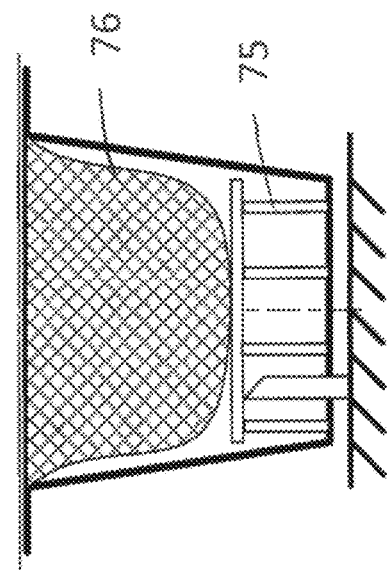

These problems may be overcome by placing an annular ring supported by legs, a structure, similar to a table, in the bottom of the pod. A suitable filter support 75 is illustrated in FIG. 5b. In FIG. 5b, an enlarged filter 76 is protected from puncture by filter support 75. As illustrated in FIG. 5c, during the brew, the legs that are softened due to the heat tend to collapse except for the part of the filter support supported by the exit needle. This structure provides for an increased volume in the pod. It has been determined that this structure provides for the ability to increase the amount of coffee from about 8 grams to more than 14 grams without risking a puncture.

Figure 6A:
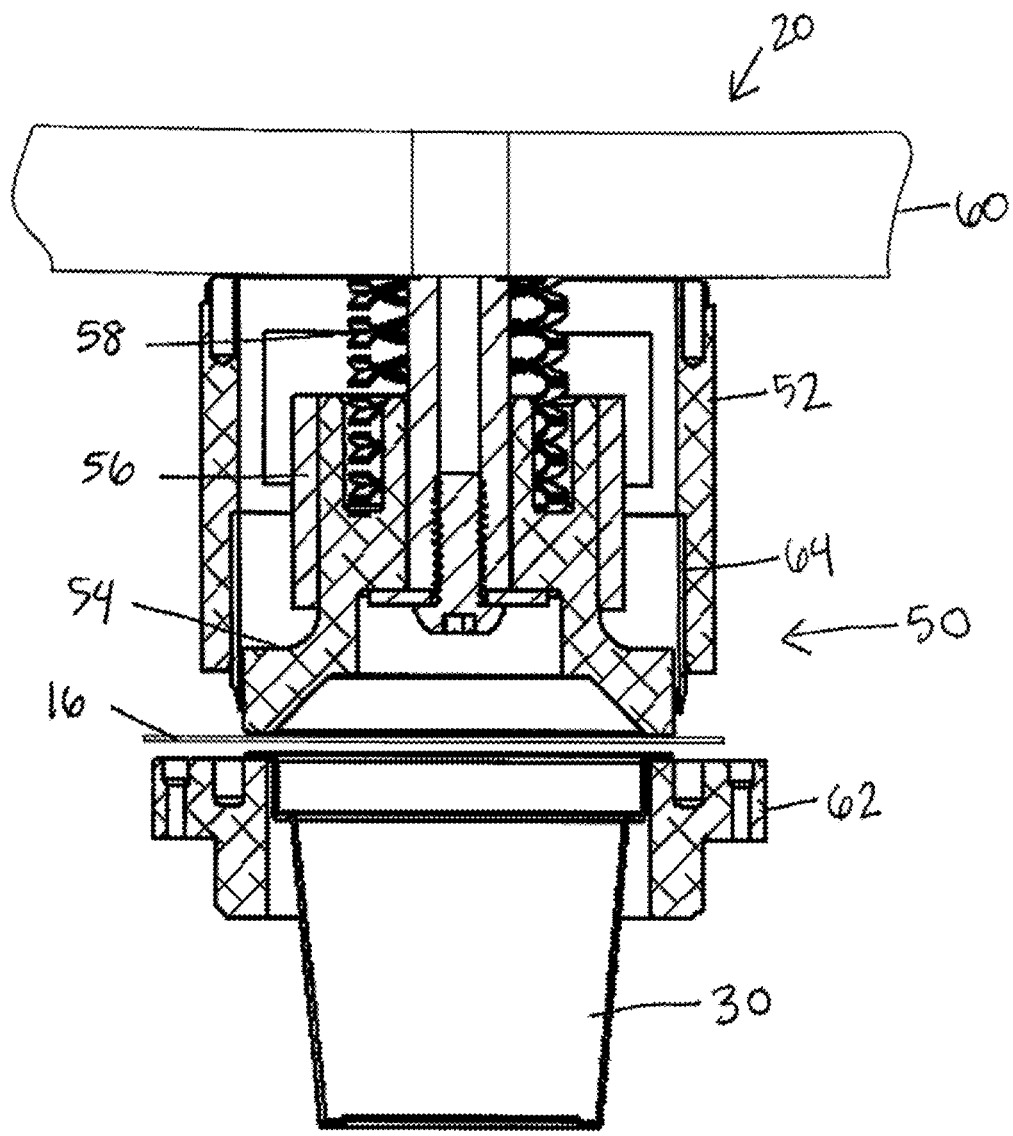
FIGS. 6*a* and 6*b* illustrate multiple views of an embodiment of a seal and trimmer component of the apparatus and packaging system.

The sealing and trim station 20 is shown in more detail at FIG. 6a. The sealing and trim station 20 consists of a vertically moving assembly 50 and a rotatable pod holder 62. The rotatable pod holder 62 is part of the pod holder assembly 14. The vertically moving assembly 50 and rotatable pod holder 62 are aligned with a tapered pin (not shown) on the assembly and a corresponding bushing on the base 10. The vertically moving assembly 50 comprises a trim cylinder 52 which contains a steel rule cutting die 64, a heated sealer shoe 54 with a Teflon® coating and a wrap-around heater 56. A coiled spring provides a uniform sealing force 58. This is held together in a concentric configuration by a heater block 60.

Figure 6B:
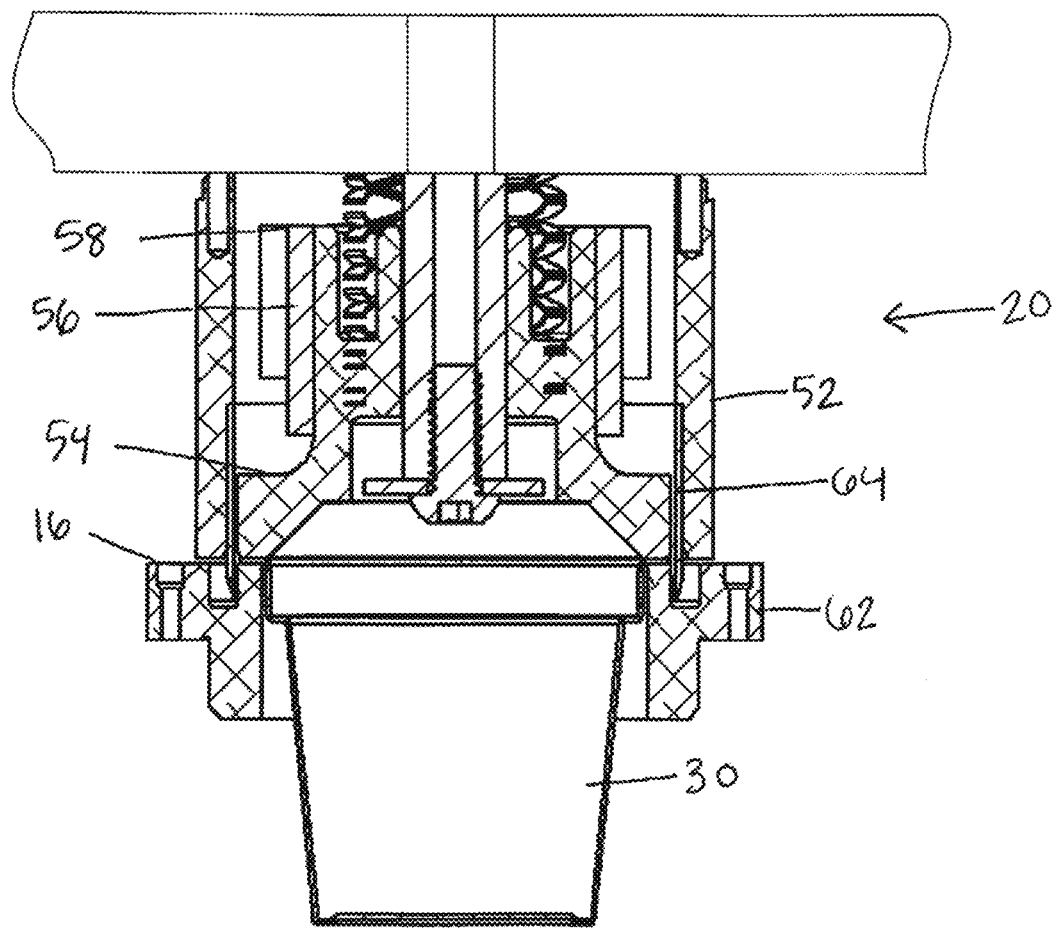

The sealing and trim station 20 is located above the rotatable platform 12, which allows the rotatable platform 12 to rotate freely below. In use, the sealer shoe 54 moves downward to press film 16 across the pods 30. FIG. 6b illustrates the sealer shoe 54 when pressing film 16 on pods 30.

The sealer shoe 54 slides on a bearing shaft (not shown) that is fastened to the heater block 60 and heated by wrap-around heaters with controlled temperatures ranging from 200-350° F. Integrated spring provides necessary sealing force. A programmable logic controller (PLC) senses temperature and controls heaters accordingly.

A heater block 60 is vertically driven by a linear actuator (not shown), which accurately positions the concentric sealing and trim station 20. Bearing shafts are spindled through the heater block 60.

An actuator is driven by stepper motor and accurately positions the heater block 60. The force is evenly divided among the seal and trim station 20 that comprise a 2×2 matrix of pod holders 62. As the heated sealer shoe 54 hits the pod lip 38 (in the course of the seal), the pods 30 are forced flat against the pod holder 62.

As set out above, the components involved in the seal operation are the heated sealing shoe 54, the pod holder 62, and the bearing shafts and supports. To achieve a positive seal, it is critical that all of these be coplanar. While the sealing shoe is guaranteed to be plumb, the plane of the multiple pod holders is dictated by the turntable that is spun from aluminum. Inherent in the fabrication process is a slight waviness in the plane of the turntable surface. Since the pod holders are fastened to the table, the aforementioned waviness causes a planar uncertainty that may compromise the seal lid to the pod.

In order to overcome the problem, the pod holders are configured to vertically float (limited by shoulder screws). Adding a layer of hard rubber to the bearing support introduces the needed compliance in the system. The hard rubber, acting as a spring, pushes the pod holders up so that the sealing components remain coplanar. This operation is illustrated in FIG. 7 which illustrates the exaggerated waviness of the turntable.

In FIG. 7, the heated sealing shoes 80 which are plumb to the machine. The sealing shoes contact the pod 81 to be sealed. The pod sits in a pod holder 82 that is free to move vertically. The horizontal position of the pod holder is defined by the turntable surface 83 (shown in cross section). A hard rubber layer 84 beneath the cup holder and above the bearing support 85 forces the pod holder in the vertical direction so that the system components are coplanar.

Once the pod holders 14 rotate to the unload position, the pods 30 are forced free of the restriction whereupon they can be removed. The actuator is mounted directly above the work surfaces using an arch, which functions to eliminate all cantilevered forces. Thus, the force is straight with a minimum amount of side deflection.

Bearings assure that the various parts remain in alignment. Two large bearing shafts (not shown) are on either side of the actuator. In addition, each heater block 60 rides in a smaller shaft bearing.

To assure that tension is maintained in the course of these operations, a tensioner (not shown) is employed. By adjusting the slip on the source reel, the tensioner can be set to midrange where correct tension is maintained.

An accurate linear actuator is positioned directly above and centered on the heater block 60. Bearing shafts on either side insure that all the critical elements are in line and move freely. For maintenance, the heater block 60 can be raised for easier access to the components.

A skid plate is tied to heater block 60 through bearings, which holds film 16 in position. The skid plate also contains the precision tapered pin. It provides rollers and adjustment to guide entry and exit of the top film.

The purpose of the film 16 is to support the graphic and seal the food product in the pods 30. The film 16 is principally comprised of two parts: a first part is printable and offers a barrier (e.g. 80 NKME, produced by Innovia) and a second part that is a backing layer designed to stick to the lip 38 of the pods 30. A PLA film produced by Bi-Ax backing not only trims well, but the PLA to PLA interface produces good seals at lower temperatures.

Labels may be digitally printed which allows for an economical means to vary images for different types of product for individual roasters. A heat tolerant varnish or a protective layer is used to protect the graphic image from the sealing heat and to protect the image from abrasion. Suitable print varnishes include known IML backing varnishes such as, for example, Cork Industries CK77A varnish (Folcroft, Pa.) or other equivalent backing varnishes. Use of Teflon® coated sealers insures no sticking after pressing and sealing.

The images may be printed on a 2×2 matrix with each unique image being spooled to a separate spindle. To satisfy the need to economically print customized top films 16, the printing is done on a digital press. Printed graphics must withstand sealing temperatures and be trimmed without chads. For printable film, Innovia 80NKME may be used. For the backing layer, BioBag TDS-95001 or a PLA film such as Evlon EV-HS1 may be used.

The filler apparatus 40 also includes a controller 24. The controller 24 directs and monitors of four operations: Fill, Seal, Trim, and Load/Unload. To reduce the size of the overall device, the Seal and Trim may be combined into one operation, resulting in 3 stations.

To minimize the foot print, the three stations are apportioned to a turntable; each station allocated a 120° sector. To achieve adequate throughput, a four pod design is chosen. Thus, four pods 30 are being filled, while four are being sealed, while the finished pods 30 are replaced with empty pods 30.

The movement of the film 16 beneath the stripper plate is controlled by two reels: a take-up reel 46 and a source reel 48. The take up reel 46 is driven whereas the source reel 48 has a drag clutch (not shown). For each matrix operation (four pods 30) the film 16 is advanced one frame. Index marks printed on the film 16 are sensed by a sensor causing the film 16 to stop.

A method of using the filler apparatus 40 includes having the pressure plate hold film 16 in position, using the heater block 60 to contact film 16 and starts the sealing process, and using the trim cylinder 52 to trim the now sealed pods 30. At the conclusion of trimming, the sequence is reversed. The trim follows the seal and then is the first to rise. By holding the film 16 by the heater block 60, extraction of the cutting die 64 is facilitated, resulting in a clean trim.

The units that make up the sealing and trim station 20 are held concentric by mounting to the heater block 60. By making the seal and trim operation integral, alignment is assured allowing for a professional look that mimics production machines that cost considerably more.

One of the advantages of sealing with a high temperature (around 350° F.) as opposed to 200° F. is that the pods 30 gets a "crystalline boost," further strengthening the sidewalls by increasing percentage of crystalline material. This insures that no blowing out occurs during use with a suitable coffee brewing machine.

The filling apparatus 40 comprises a controller 24 comprising a screen. The MAIN screen displays all the key information for production running, including a target count, a present count, whether the system is ready, and buttons to go to screens such as "home table," "reset count," "reset," "manual," "maint," and "clear."

The MANUAL screen displays the heater shutdown in minutes, and buttons to go to screens such as "turntable," "fill," "film," "press," "heaters," "inputs," "outputs," and "main."

The PRESS screen displays the upward extreme and the downward excursion during the press operation. The screen also comprises buttons to go to screens such as "maint," "clear," "press," "jog enable," and "manual."

The FILM screen displays the pulse ON delay and the pulse duration, and buttons to go to screens such as "index," "abort," "teach," "manual pulse," "manual," and "reset fault."

The TALBE screen displays the target count, the velocity count, the position count, and the offset count. It also include buttons to go to screen such as "index," "zero," "home table," "PosSense override," and "manual."

The FILL screen displays the fill time in seconds. It also includes buttons to go to screens such as "fill," "abort," "reset fault," and "manual."

The HEATERS screen set the target temperature. A green indicator light identifies when the heater is on, which should be between 30-60% of the time. If the temperature fails to respond to the prescribed plan, the green heater button will turn off. The screen also includes buttons to go to screens, such as "htrs," "set point," "temp," "tune," "abort," "max %," "temp override," and "manual."

A user may set up the filling apparatus 40 as follows. A power cord should be plugged into a dedicated line fused to 15A. Once the filler apparatus 40 is powered on, the switch should glow green and the controller 24 should display the main menu (a "MAIN" screen).

For adjustments, the filler apparatus 40 is put in a manual mode. From the MAIN screen, the user would select "Manual." A password should be entered when prompted, which brings up to the MANUAL screen. Using the touch screen, a "Press" button should be selected, bringing up to the PRESS screen. From this screen, a "Clear" button should be pressed. This will move the sealer shoe 54 into a "home" position and is a prerequisite for most of the operations. Once homed, the "Maint" button is selected, which causes the sealer shoe 54 to rise to its highest position (maintenance level).

To load the film 16 into the filler apparatus 40, a user starts in a maintenance level. The film winder 22 comprises a top reel 46 that is a take-up reel, and is driven to the next index mark. A bottom reel 48 is a source reel and is dragged. The spring loaded tensioner maintains tension on the film 16 during the various cycles. Alignment bearing on either side of the stripper plate insures that the film 16 remains centered. The slack is backed out by manually winding the source reel 48. The film 16 should be centered on the film winder 22 and the spring loaded tensioner and position so that the film 16 is between the index sensor and the round post. A top film bracket is located on the large film plate, the stopping point of the film 16 can be advanced or retarded by moving the bracket up and down respectively. When loading the film 16, the film 16 is positioned between the sensor and the backing rod.

Once new film 16 is loaded, the user moves to the FILM screen (press manual-then film) and advances the film 16 by selecting "Index." The film 16 should stop midway in the next index mark. The tension in the slip clutch should be adjusted so that the tensioner operates around its midpoint when the sealer shoe 54 is moving between extremes.

By removing the power (activate EPO switch), the rotatable platform 12 can be manually rotated until the tapered pin in the stripper plate is in line with the mating bushing in the rotatable platform 12 and easily fits by manually pushing the stripper plate down. Power is restored (undo EPO by twisting the lit knob clockwise) and the sealer shoe 54 is homed. Using tape, the rotatable platform 12 position is marked with a vertical mark and a corresponding mark on the base 10. For a user to adjust, the user must use the controller 24. From the TABLE screen (press manual-then table), press the "Advance" button three times. The rotatable platform 12 should stop at exactly its starting point (position A), which will provide a reference for defining the remaining two positions on the rotatable platform 12. Repeat the process for positions B and C. Finally, activating the "Home Table" will cause the rotatable platform 12 to rotate and stop at the referenced position.

It is convenient to retain these positions as references during the early (learning) stages of machine operation.

For adjusting registration, the rotatable platform 12 must first be at one of its reference positions. Registration is achieved by adjusting the film sensor on the index bracket.

The film index bracket is mounted on the film plate. Moving the film bracket up will cause the film 16 to stop sooner (retard). Correspondingly, moving downward causes the film 16 to stop later (advance). From the clear position, advance the film noting that it again stops at the midpoint of the index mark.

Once the rotatable platform 12 is registered and the film 16 indexed, engage the "Press" button from the PRESS screen (press manual-then press). This will cause the sealer shoe 54 to its lowest position and in the process, trim the film. The film 16 is properly registered when the cut hole is centered on the graphic. Side-to-side adjustment is made by adjusting the rollers in the stripper plate.

The film 16 is optimally adjusted when the film 16 is centered on the film winder 22 with the thumb-screwed ends just touching the film 16. The spring loaded tensioner should be roughly in a 3 o'clock position The rotatable platform 12 is indexed several times with interleaving press and film advance operations. A slight correction of the rotatable platform 12 indicates the tapered pin is doing its job.

Press parameters are viewed from the PRESS screen (press manual-then press). The values indicate the height above "Clear" that defines the maintenance level and the depth of the stroke below "Clear" that defines the press level. These are adjusted at the factory and should not be adjusted in the field unless directed.

The clear level is the level to which the actuator is homed. Thus the terms "Clear" and "Home" are synonymous.

Depth must be sufficient for the cutting die 64 to fully penetrate the film 16. This number (Press Level) varies depending on the style of cutter used. It is adjusted at the factory and should not be changed.

For reference, a pencil mark can be applied to the outside of the container 18 that reflects this depth. This provides a visual indication of press depth. Failing to reach that mark would indicate the actuator needs to be re-homed.

Maintenance level represents the highest position of the actuator. It is sufficient to allow removal of the rotatable platform 12 and facilitates maintenance and inspection. It is factory adjusted and requires no further adjustment. Should the sealer shoe 54 hit an obstruction on its upward travel, it would require that actuator needs to be re-homed by selecting "Clear."

The home position is defined by a proximity sensor mounted on the film support that senses the height of the bearing shaft. In virtually all cases "homing" the actuator is a prerequisite for the other operations. If this sensor is adjustable, the position should be noted by a mark on a tape. This will facilitate restoring that position in the event it is accidentally moved. A change in that sensor's position will affect the film registration and cause the Maintenance and Press Levels to be redefined.

The auger assembly 26 is mounted by the base 10 by unscrewing the large knurled knobs (not shown) on top of the acrylic container 18 several turns so that the auger assembly 26 can be slid into position. The drive pulley (not shown) is rotated by hand until the drive pins align with the slots in the assembly. At that point the knobs can be tightened, thereby drawing the two parts together. When the space between the acrylic cylinder 18 and the vertical wall of the fill tower is uniform, the assembly is in proper adjustment.

On each of the auger shafts, is an agitator to assure an even distribution of the food product. They are adjustable and set at a nominal position. Properly adjusted, they will assure an even and consistent distribution of the food product The augers moves counter clockwise (use LH threads). A single screw at the base allows base and container 18 to be removed allowing good access to internal parts. All of the parts are washable using standard means.

In the event the agitator vanes become bent, they can be checked by rotating the drive pulley on a mounted cylinder without the container 18. Care should be exercised so as not to scratch the container 18.

It is suggested by the auger manufacturer that the food product of the cylinder not be allowed to drop below the 50% level for uniform filling of the food product.

Should there be a need for nitrogen loading; a flair fitting is mounted on the auger cover which will feed nitrogen into the cylinder. From the FILL screen (press manual-then fill), the fill time can be adjusted (Figure M). The factory setting is 4.0 seconds.

Food product can be loaded through the port in the top cover 28. The cap that closes the opening in the container 18 fits the top as well. The cover 28 must be fully in place for the auger motor to work. Note that it takes several auger cycles before the augers are filled and deliver a consistent amount of the food product.

Four wrap-around heaters 56 are used to heat the sealing surfaces to the desired temperature. This temperature is adjustable and controlled by the PLC from the HEATERS screen (press manual-then heaters). The PLC program maps out a heating course to minimize the thermal overshoot. A single thermocouple is connected to one of the heater blocks 60 (referred to as "shoes") allowing the PLC to control the progress. With heaters OFF, the indicated temperature would be room temperature.

The heater temperature is defined by the set point temperature. This could vary depending on the film being used and would normally be in the range of 195° F. to 325° F. Once the target temperature is defined, the heater block 60 is enabled by pressing the green "Heater On" button on the controller 24. The PLC will monitor the rise with time, checking that the heater blocks 60 are following the prescribed course as directed. Failure to follow that pattern within defined limits could indicate a fault with the heating system and cause the PLC to turn off heater power.

The apparent instability can be attributed to the large amount of material in close proximity that is heated in the process of heating the sealing shoes. Once thermal equilibrium is reached, however, the temperature will remain steady. To maintain temperature, the heat block 60 will be on about a third of the time (33% duty cycle) and so indicated in the HEATERS screen.

If the heater block 60 reaches 350° F., a thermal limit switch will open and cause all control power to be removed from the system, similar to the EPO switch being pressed. Once the temperature is reduced to about 240° F., the switch can be manually reset.

Optionally, the heating block 60 can be automatically shut down after a certain amount of time lapses without activity. This option can be invoked and time set from the HEATERS screen (press manual-then heaters).

Automatic Run Mode (Production Mode)

This mode is reached by selecting the "Main" button from the MANUAL screen (press manual-then main) on the controller 24. Alternatively, this mode is the default state when power is first turned on.

The controller 24 has a screen that comprises all the key data. For example, the controller 24 can indicate that the film 16 needs to be indexed or that one or more pods 30 are not in place beneath the auger assembly 26. It can also prompt the operator to home the system.

An array of lights on the top of the controller 24 indicates the status of all the major components. When all are green, the machine is ready to run. Distinctive audio tones may be employed as well.

As indicated earlier, the filler apparatus 40 is semi-automatic in that sealed pods 30 are to be manually unloaded and replaced with empty pods 30 to be filled. Once done, the operator presses the 2-button switch indicating that the empty pods 30 are in place, thereby starting the next cycle.

In each cycle, the auger will fill empty pods 30 while the seal and trim station 20 will seal pods 30 from the previous cycle. A resettable counter keeps track of the pods 30 processed and will signal completion. This is a pipeline process gated by the user.

At the conclusion of each press cycle, the system will perform a home operation. Likewise the rotatable platform 12 resets its count with each cycle. Both of these actions will prevent error creep.

Should empty pods 30 be detected, the fill and seal operations will be skipped and the error corrected at the Load/Unload station. Accordingly, the count will not be recorded.

There is no substitute for an attentive operator. There are several early warning signs that will indicate an adjustment is required such as press level excursion fails to meet the mark, registration begins creeping, turntable is stopping at a noticeably different position (some back and forth variation is normal), press motor is hot to touch, clear position is higher than normal, noticeable sound changes or jerking, or ground coffee on sealing surface. Most of these are manifest in degraded top film sealing to one extent or another. So looking at the formed cups is probably the best barometer.

Like any machine, periodic maintenance is a good insurance policy. Cleaning the heated shoes with a pad designed for Teflon® surfaces at the start of a shift is recommended. Ground coffee grains that fall in the holes beneath the fill station over time will impede the operation of the sensor and should be carefully vacuumed.

Various modifications and additions can be made to the exemplary embodiments discussed without departing form the scope of the present disclosure. For example, while the embodiments described above refer to particular features, the scope of this disclosure also includes embodiments having different combinations of features and embodiments that do not include all of the described features. Accordingly, the scope of the present disclosure in intended to embrace all such alternatives, modifications, and variations as fall within the scope of the claims, together with all equivalents thereof.

What is claimed is:

1. A protective filter support for providing an increased effective volume of a single-serve pod, comprising:
    an upper filter support portion vertically supported by one or more legs spaced at intervals around the upper filter support portion and configured to contact a bottom portion of the pod;
    the one or more legs configured to provide support to the upper filter support portion counter to a filter that expands and thereby applies a downward pressure on the upper filter support portion during a brewing process, wherein at least one leg is softened by heat during brewing; and
    wherein at least one of the one or more legs operates to support the upper filter support portion during brewing such that a needle can penetrate the pod but does not penetrate the filter when the filter expands during brewing such that the upper filter support portion protects the needle from penetrating the filter when a downward vertical pressure provided by the expanding filter is applied to the upper filter support portion.

2. The protective filter support of claim 1, wherein the upper filter support portion is an annular ring.

3. The protective filter support of claim 1, wherein the one or more legs operate in combination with the needle when introduced into the pod to support the upper filter support portion when the downward vertical pressure provided by the expanding filter is applied to the upper filter support portion.

4. The protective filter support of claim 1, wherein the needle is an exit needle configured to allow brewed beverage to flow out of the pod.

5. The protective filter support of claim 1, wherein the brewing is of coffee precursor material into a coffee beverage.

6. The protective filter support of claim 1, wherein during the brewing, the legs that are softened due to the heat are configured to collapse except for one or more legs proximate a part of the upper filter support portion, wherein the upper filter support portion is also at least partially supported by the needle.

7. The protective filter support of claim 1, wherein the pod fitted with the protective filter support provides an increase in pod material capacity from about 8 grams to at least 14 grams.

8. The protective filter support of claim 1, wherein the filter comprises paper.

9. The protective filter support of claim 1, wherein the filter is configured to sit on a ledge of the pod or be fastened to a wall of the pod as an integral unit.

10. The protective filter support of claim 1, wherein a lower portion of filter is positioned sufficiently low to hold sufficient amount of product to be brewed, and sufficiently high to avoid being inadvertently pierced when the needle is introduced to the pod.

11. The protective filter support of claim 1, wherein the filter support is built into the pod.

12. The protective filter support of claim 1, wherein the filter support is a separate component that is inserted into the pod.

13. A single-serve pod, comprising:
an outer shell defining an interior of the pod, a filter containing a product to be brewed, and a film lid at a top of the pod; and
a protective filter support for providing an increased effective volume of the pod, comprising:
an upper filter support portion vertically supported by one or more legs spaced at intervals around the upper filter support portion and configured to contact a bottom portion of the pod,
the one or more legs configured to provide support to the upper filter support portion counter to the filter that expands and thereby applies a downward pressure on the upper filter support portion during a brewing process, wherein at least one leg is softened by heat during brewing, and
wherein at least one of the one or more legs operates to support the upper filter support portion during brewing such that a needle can penetrate the pod but does not penetrate the filter when the filter expands during brewing such that the upper filter support portion protects the needle from penetrating the filter when a downward vertical pressure provided by the expanding filter is applied to the upper filter support portion.

14. The single-serve pod of claim 13, wherein the pod is formed of polylactic acid.

15. The single-serve pod of claim 14, wherein the polylactic acid is made from lactic acid obtained from corn starch.

16. The single-serve pod of claim 13, wherein the pod is vacuum formed from one or more sheets.

17. The single-serve pod of claim 13, wherein the pod is injection molded.

18. The single-serve pod of claim 13, wherein the filter support insert is built-in to the pod.

19. The single-serve pod of claim 13, wherein the filter support insert is a separate component that is inserted into the pod.

20. The single-serve pod of claim 13, wherein the top film comprises a graphic image.

\* \* \* \* \*